United States Patent Office 2,766,292
Patented Oct. 9, 1956

2,766,292

PROCESS FOR PREPARING OXYALKYLATED DERIVATIVES

Louis T. Monson, Puente, and Woodrow J. Dickson, Monterey Park, Calif., assignors to Petrolite Corporation, Los Angeles, Calif., a corporation of Delaware No Drawing. Application June 4, 1953, Serial No. 359,665

10 Claims. (Cl. 260—615)

This invention relates to the preparation of substantially anhydrous and substantially undiluted oxyalkylated derivatives of a particular class of oxyalkylation-susceptible organic compounds which, because of certain characteristics they possess, are not otherwise oxyalkylatable to produce such derivatives.

Oxyalkylation-susceptible organic compounds are characterized by their possession of labile hydrogen atoms, i. e., hydrogen atoms attached to oxygen, nitrogen, or sulfur. Their oxyalkylation may proceed with greater or lesser readiness; but oxyalkylated derivatives can be prepared from them.

The oxyalkylating agents conventionally employed to produce oxyalkylated derivatives are the lower alkylene oxides, ethylene oxide, propylene oxide, butylene oxide, glycid, and methylglycid. These may be defined as alpha-beta alkylene oxides containing four carbon atoms or less. They may be employed singly, in sequence, or in admixture.

Unfortunately, there are some situations, like those with which this invention is concerned, in which the employment of such conventional oxyalkylating agents is not practicable. Some starting materials, although inherently oxyalkylation-susceptible, are solids which are substantially insoluble in any of the oxyalkylation-resistant solvents available for use in the preparation of oxyalkylated derivatives.

For example, many oxyalkylation-susceptible solids are insoluble in xylene, which is a frequently used solvent in oxyalkylation procedures. Xylene is oxyalkylation-resistant and is readily separable from the oxyalkylation mass by simple distillation.

Furthermore, even though such starting materials may be soluble in a few unusual oxyalkylation-resistant solvents, the latter are themselves comparatively non-volatile. Various ethers might in some cases be considered suitable solvents for the oxyalkylation-susceptible solid starting material. Such ethers, like the diethers of the polyglycols, in addition to being expensive, are not susceptible to easy separation from the oxyalkylation mass by distillation. Hence, they are not readily recoverable from the oxyalkylation mass by distillation, to leave an undiluted oxyalkylated derivative.

Some solids which are oxyalkylation-susceptible are in fact most soluble in water; but water is not an acceptable solvent for use in oxyalkylation processes employing the conventionally used alkylene oxides because it reacts with such alkylene oxides to produce polyglycols, during oxyalkylation.

We are aware that it has been proposed in the past to conduct oxyalkylations using the conventional alkylene oxides in aqueous solutions, presumably on the assumption that the oxide did not react with the water. However, it is now established that such reaction with the water occurs to some extent. The oxyalkylated mass produced in such aqueous systems therefore contains varying proportions of alkylene glycols as contaminants or adulterants. Our process avoids this difficulty because it is conducted under substantially anhydrous conditions in all cases. The starting solid material, the catalyst, and the alkylene carbonates employed by us are all used in substantially anhydrous form.

Furthermore, many oxyalkylation-susceptible solids cannot be used in undiluted form in an oxyalkylation process using the alkylene oxides, and simply liquefied by heating prior to introduction of the oxyalkylating agent, because they undergo partial decomposition as they melt. If maintained at the temperature at which fusion just begins to be apparent, for a time such as 15 minutes, they undergo at least partial decomposition. If they exhibit such behavior in the presence of an oxyalkylation catalyst, like the alkali carbonates, they come within our class of suitable starting materials for use in our present process.

The foregoing statement of difficulties is applicable to greater or lesser extent to a number of oxyalkylation-susceptible compounds, including those recited below. The alkylene oxides are not usable for their oxylation for the above stated reasons.

Our present invention overcomes such difficulties and permits oxyalkylation of such materials to be accomplished by simple and inexpensive means. Thus, we employ as primary oxyalkylating agents the carbonates which are the counterparts of the foregoing alkylene oxides, viz., ethylene carbonate, propylene carbonate, butylene carbonate, hydroxypropylene carbonate, and hydroxybutylene carbonate. Of these, only ethylene carbonate and propylene carbonate are currently in commercial production, although the others will doubtless achieve similar commercial status in time.

More specifically, our invention relates to a process for preparing substantially anhydrous, substantially undiluted oxyalkylated derivatives from an anhydrous, solid, oxyalkylation-susceptible pentaerythritol compound, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid.

In its narrower scope and more important aspect, our invention relates to a two-step process for preparing substantially anhydrous, substantially undiluted oxyalkylated derivatives from an anhydrous, solid, oxyalkylation-susceptible pentaerythritol compound, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

Briefly described, our broad process is practiced by introducing into a suitable processing vessel the solid, oxyalkylation-susceptible starting material, preferably in finely divided form; the desired or required proportion of alkylene carbonate; and a minor proportion of an alkaline catalyst such as an alkali carbonate. The mixture is warmed, preferably with stirring. As the temperature reaches a certain critical level, usually somewhat above 100° C., there is a vigorous effervescence in which carbon dioxide is liberated, and the oxyalkylated derivative is formed. In such instances where the starting material is acidic, it is used at least partially in the form of a salt, e. g., an alkali salt such as may be produced in situ by adding enough alkaline catalyst to leave a slight excess over what is required to leave the mixture slightly alkaline.

It is sometimes desirable to modify this general procedure in various other ways. For example, the alkylene carbonate is introduced into a vessel and warmed until liquid. The catalyst is added. The solid, oxyalkylation-susceptible material is then slowly introduced in finely divided form, with stirring, and the temperature is slowly raised to the reaction point. Such procedural variation is useful where the oxyalkylation-susceptibility of the starting material is not great and where use of the first-described procedure above would produce a solid mass in the vessel which could not be readily handled thereafter.

In the two-step embodiment of our process, we usually employ only enough alkylene carbonate in the first step to produce a liquid or readily liquefiable derivative, which contains a relatively small proportion of oxyalkylene radicals. We then continue oxyalkylation using the conventional alkylene oxides. Stated another way, this two-step process is employed to produce, first, intermediates; then more highly oxyalkylated products are prepared in the second step using the more economical, conventional alkylene oxides. This two-step process is the more important aspect of our invention.

In the appended claims, we have specified that the intermediate product prepared in the first step of the two-step process shall be a liquid or at least liquefiable at the temperature required to effect the oxyalkylation by use of the alkylene oxides in the second step of our process. Said second step is conducted at conventional oxyalkylation temperatures, usually between about 100° C. and 200° C.

One incidental advantage of using the alkylene carbonates for oxyalkylation is that they are relatively inert materials as compared with the alkylene oxides. Their use therefore entails smaller hazards. Oxyalkylations using them are conducted with greater safety than if the alkylene oxides were employed. Processing vessels are usually not required to be pressure-resistant when the alkylene carbonates are employed, whereas ethylene oxide and propylene oxide, for example, are required to be employed in pressure vessels because of their physical properties.

All oxyalkylation-susceptible pentaerythritol compounds usable as starting materials do not react with equal readiness with the alkylene carbonates in our process. Where the starting material, although presumably oxyalkylation-susceptible as judged by its structure, is of very high molecular weight, or where steric or other obscure influences are adverse, oxyalkylation may proceed at extremely slow rates. However, if the starting material is oxyalkylation-susceptible, its oxyalkylation may be accomplished in due time by means of the alkylene carbonates mentioned above.

The temperature at which the oxyalkylation reaction will occur, using the alkylene carbonates, must be expected to vary somewhat with the choice of pentaerythritol compound starting material and alkylene carbonate. In all cases, the proper technique to be initially employed is to advance the temperature cautiously and so to determine the minimum temperature required to effect reaction. This procedure requires no especial skill and no experimentation, in that the vigorous effervescence resulting from the liberation of carbon dioxide in the reaction is ready evidence of such reaction. As stated above, the reaction usually requires a temperature somewhat above 100° C. The maximum feasible oxyalkylation temperature is of course the decomposition temperature for the mixture of solid starting material, catalyst, and alkylene carbonate, and above which temperature pyrolysis of the starting material, polymerization of the alkylene carbonate, or other undesired reaction begins to occur.

The oxyalkylation catalysts employed by us are usually the alkali carbonates such as sodium or potassium carbonate, in substantially anhydrous form. Where the starting material is acidic, at least sufficient alkali carbonate should be added to neutralize such acidity. Thereafter an additional amount of alkali carbonate is usually desirably included to accelerate the oxyalkylation process. However, in some instances, the alkali-neutralized starting material is sufficiently alkaline to supply the desired catalytic influence, without addition of further amounts of alkali carbonate.

The finished oxyalkylated product will of course contain such inorganic catalyst. The catalyst will usually separate readily from the oxyalkylated mass on standing, especially if slightly warm. Since the residual proportions of catalyst in the supernatant product are usually of very small magnitude after such settling, we consider they do not materially dilute or contaminate our finished products.

In some instances, solid, oxyalkylation-susceptible substances, which may have been stated in the literature to have definite melting points, are nevertheless susceptible to progressive decomposition if maintained at or about the temperature at which they begin to fuse, for any period of time. Some such substances similarly undergo progressive deterioration if subjected to such temperatures in the presence of an alkaline material, like an oxyalkylation catalyst, for any period of time. Such substances which, although they may have recorded definite melting points, are unstable under oxyalkylating conditions as described, are included among our usable starting materials.

We have therefore limited our usable starting materials to those which are either (1) infusible or which (2) suffer at least partial decomposition if maintained at their beginning-of-fusion temperature for a period of at least 15 minutes in the presence of an oxyalkylation catalyst. Additionally, such solid starting material must be insoluble in oxyalkylation-resistant, distillation-separable solvents, as already stated.

As the molecular weight of the alkylene carbonate rises, its reactivity with the pentaerythritol compound starting materials is reduced. Since, for example, ethylene carbonate is more reactive than propylene carbonate, and propylene carbonate is more reactive than butylene carbonate, there may be marked differences in the speed of oxyalkylation when different alkylene carbonates are used. In marginal cases, it will be understood, a pentaerythritol compound starting material may be oxyalkylation-susceptible in the sense that it is readily reactive toward ethylene carbonate or propylene carbonate, but it may be rather insensitive toward butylene carbonate.

Our broad process may be practiced using more than one alkylene carbonate, and our two-step process may be practiced using, in addition, more than one alkylene oxide, to produce mixed oxyalkylated derivatives. In such cases, the alkylene carbonates may be employed in sequence or they may be employed as a mixture, as desired. The same is true of the alkylene oxides employed in our two-step process, which may be used in sequence or as a mixture.

The class of starting materials suitable for use in our present process have been termed "pentaerythritol compounds" above. Within this class we include pentaerythritol itself and its polymers, and specifically, di-, tri-, tetra-, penta-, hexa-, hepta-, octa-, nona-, and decapentaerythritol.

Our class of suitable starting materials includes obvious equivalents of the pentaerythritols which retain the oxyalkylation-susceptibility of their parents, and which are either infusible or decomposable on short heating at their beginning-of-fusion temperature.

The above pentaerythritol compounds are oxyalkylation-susceptible, since they contain a plurality of hydroxyl groups. They are insoluble in xylene and other oxyalkylation-resistant solvents. Pentaerythritol has a recorded melting point of about 250° C.; but it shows decomposition if held at this temperature in the presence of alkali carbonates for 15 minutes. The polymerized pentaerythritols approach infusibility in this respect.

As examples of our process, in which the foregoing starting materials are usable, the following are typical but not exclusive.

In all cases, the apparatus employed to produce the products in the laboratory was a conventional resin pot assembly, fitted with a stirrer. This is a glass apparatus comprising a lower bowl or vessel, and an upper cap section containing several outlets, for the stirrer shaft, a thermometer, and a reflux condenser, and a charge hole fitted with a stopper. The design is conventional and need not be described further. Heat is supplied by a glass-textile heating mantle which fits the lower portion of the assembly, and which is regulated by inclusion of a rheostat in the electrical circuit. Such devices are likewise wholly conventional, and require no description here. Motor-driven stirrers, of the kind here used, and having stainless-steel or glass shafts and paddles, are likewise conventional laboratory equipment.

*Example 1*

We heated a mixture of 408 grams of pentaerythritol, 528 grams of ethylene carbonate, and 10 grams of potassium carbonate, with stirring, in a glass resin pot assembly, raising the temperature cautiously to about 155° C. At that point the mixture evolved much carbon dioxide and became homogeneous. Heating was continued for 6 hours, with a maximum temperature of 200° C. The product was a dark, viscous liquid, soluble in xylene-methanol mixture and in water.

*Example 2*

We heated 381 grams of dipentaerythritol, 528 grams of ethylene carbonate, and 10 grams of potassium carbonate, with stirring, in a glass resin pot assembly, raising the temperature cautiously to about 170° C. At that point the mixture evolved much carbon dioxide and became homogeneous. Heating was continued for 6 hours, with a maximum temperature of 180° C. A very viscous, dark-brown liquid was obtained, which was soluble in xylene-methanol mixture and in water.

*Example 3*

We heated 272 grams of tripentaerythritol, 528 grams of ethylene carbonate, and 10 grams of potassium carbonate, with stirring, in a glass resin pot assembly, raising the temperature cautiously to about 150° C., where the mixture became homogeneous, with evolution of carbon dioxide. Heating was continued for 6 hours, a final temperature of 190° C. being attained. The product was a dark, viscous liquid, soluble in xylene-methanol mixture and in water.

*Example 4*

We heated 408 grams of pentaerythritol, 612 grams of propylene carbonate, and 10 grams of potassium carbonate, with stirring, in a glass resin pot assembly, raising the temperature cautiously to about 160° C. At that point the mixture became homogeneous and much carbon dioxide was evolved. Heating was continued for 8 hours, maximum temperature being 195° C. The product was a very viscous, brown liquid, soluble in xylene-methanol mixture and in water.

*Example 5*

We heated 381 grams of dipentaerythritol, 612 grams of propylene carbonate, and 8.5 grams of potassium carbonate, with stirring, in a glass resin pot assembly, raising the temperature cautiously to about 165° C. At that point the mixture became homogeneous; and on further heating it became darker, with evolution of much carbon dioxide. Heating was continued for 6 hours. The product was a very viscous, dark brown, liquid, soluble in xylene-methanol mixture and in water.

*Example 6*

We heated 372 grams of tripentaerythritol, 612 grams of propylene carbonate, and 10 grams of potassium carbonate with stirring, in a glass resin pot assembly, raising the temperature cautiously to about 160° C. At that point the mixture became homogeneous. Upon further heating much carbon dioxide was evolved. Heating was continued for 8 hours, the maximum temperature being 190° C. The product was a viscous, dark liquid, soluble in xylene-methanol mixture and in water.

*Example 7*

We have repeated Example 1, but instead of using ethylene carbonate we have used a mixture of 264 grams of ethylene carbonate and 306 grams of propylene carbonate. Reaction time was 8 hours. Otherwise, the conditions were the same as in Example 1. The product was a viscous, dark liquid.

*Example 8*

We have repeated Example 1, but instead of using ethylene carbonate we have used 696 grams of butylene carbonate. Reaction time was 10 hours. Otherwise, the conditions were the same as in Example 1. The product was a viscous, dark liquid.

*Example 9*

We have repeated Example 1, but instead of using ethylene carbonate we have used 708 grams of hydroxypropylene carbonate. Reaction time was 10 hours. Otherwise, the conditions were the same as in Example 1. The product was a viscous, dark liquid.

*Example 10*

We have repeated Example 1, but instead of using ethylene carbonate we have used 792 grams of hydroxybutylene carbonate. Reaction time was 10 hours. Otherwise, the conditions were the same as in Example 1. The product was a viscous, dark liquid.

*Example 11*

We have repeated Example 1. Then, after transferring the reaction mass to a conventional oxyalkylating autoclave and adding 10 grams of sodium hydroxide, we have introduced, with stirring, 528 grams of ethylene oxide, at a temperature of about 165° C. Maximum pressure was about 50 p. s. i. The time required for the second oxyalkylating step was 5 hours. The product was a dark, viscous liquid.

*Example 12*

We have repeated Example 1. Then, after transferring the reaction mass to a conventional oxyalkylating autoclave and adding 10 grams of sodium hydroxide, we have introduced, with stirring 696 grams of propylene oxide, at a temperature of about 120° C. Maximum pressure was about 40 p. s. i. The time required for the second oxyalkylating step was 7 hours. The product was a dark, viscous liquid.

*Example 13*

We have repeated Example 1. Then, after transferring the reaction mass to an oxyalkylating autoclave and adding 10 grams of sodium hydroxide, we have introduced, with stirring, a mixture of 264 grams of ethylene oxide and 348 grams of propylene oxide, at a temperature of about 140° C. Maximum pressure was about 50 p. s. i. Time required for the second oxyalkylating step was about 8 hours. The product was a dark, viscous liquid.

*Example 14*

We have repeated Example 7. Then, after transferring the reaction mass to an oxyalkylating autoclave and adding 10 grams of sodium hydroxide, we have introduced, with stirring, a mixture of 264 grams of ethylene oxide and 348 grams of propylene oxide, at a temperature of about 140° C. Maximum pressure was about 50 p. s. i. Time required for the second oxyalkylating step was about 8 hours. The product was a dark, viscous liquid.

*Example 15*

We have repeated Example 1, but substituting 245 grams of tetrapentaerythritol for the pentaerythritol there used. Otherwise the conditions were the same as those of Example 1. The product was a dark, viscous liquid.

*Example 16*

We have repeated Example 1, but substituting for the pentaerythritol used there 304 grams of pentapentaerythritol, and continuing the reaction for 8 hours. Otherwise the conditions were the same as those of Example 1. The product was a dark, viscous liquid.

*Example 17*

We have repeated Example 1, but substituting for the pentaerythritol used there 363 grams of hexapentaerythritol, and continuing the reaction for 8 hours. Otherwise, the conditions were the same as those of Example 1. The product was a dark, viscous liquid.

*Example 18*

We have repeated Example 1, but substituting 422 grams of heptapentaerythritol for the pentaerythritol used there, and continuing the reaction for 8 hours. Otherwise the conditions were the same as those of Example 1. The product was a dark, viscous mass.

*Example 19*

We have repeated Example 1, but substituting for the pentaerythritol used there 399 grams of decapentaerythritol, and continuing the reaction for a total of 8 hours. Otherwise the conditions were the same as those of Example 1. The product was a dark, viscous liquid.

The products of our process find a number of uses, principally the same uses as the pentaerythritols, and in which they give superior performance. As oxyalkylation is continued, surface-active derivatives are produced, which are useful in wetting, dispersing, and emulsifying operations. They are useful in demulsifying processes, in which water and oil are separated from their emulsions, and particularly crude oil and oil-field waters.

We claim:

1. A process for preparing substantially anhydrous, substantially undiluted oxyalkylated derivatives from an anhydrous, solid, oxyalkylation-susceptible pentaerythritol compound, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst at a temperature producing effervescence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid.

2. A two-step process for preparing substantially anhydrous, substantially undiluted oxyalkylated derivatives from an anhydrous, solid, oxyalkylation-susceptible pentaerythritol compound, which solid satisfies one of the following two conditions: (a) it is infusible; (b) it suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst at a temperature producing effervescence of carbon dioxide and for a period of time sufficient to form an oxyalkylated derivative of said solid; the proportion of alkylene carbonate employed being sufficient to yield a product which is liquid at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one member selected from the aforesaid class of alkylene oxides.

3. The process of claim 2, wherein the alkylene carbonates used are characterized by possessing at least 2 and not more than 3 carbon atoms and no hydroxyl groups.

4. The process of claim 2, wherein the alkylene carbonates and the alkylene oxides used are characterized by possessing at least 2 and not more than 3 carbon atoms and no hydroxyl groups.

5. The process of claim 2, wherein the alkylene carbonates and the alkylene oxides used are characterized by possessing at least 2 and not more than 3 carbon atoms and no hydroxyl groups, and the oxyalkylation-susceptible starting material is pentaerythritol.

6. The process of claim 2, wherein the alkylene carbonates and the alkylene oxides used are characterized by possessing at least 2 and not more than 3 carbon atoms and no hydroxyl groups, and the oxyalkylation-susceptible starting material is a polypentaerythritol.

7. The process of claim 2, wherein the alkylene carbonates and the alkylene oxides used are characterized by possessing at least 2 and not more than 3 carbon atoms and no hydroxyl groups, and the oxyalkylation-susceptible starting material is dipentaerythritol.

8. The process of claim 2, wherein the alkylene carbonates and the alkylene oxides used are characterized by possessing at least 2 and not more than 3 carbon atoms and no hydroxyl groups, and the oxyalkylation-susceptible starting material is tetrapentaerythritol.

9. The process of claim 2, wherein the alkylene carbonates and the alkylene oxides used are characterized by possessing at least 2 and not more than 3 carbon atoms and no hydroxyl groups, and the oxyalkylation-susceptible starting material is decapentaerythritol.

10. The process of claim 2, wherein the alkylene carbonates and the alkylene oxides used are characterized by possessing at least 2 and not more than 3 carbon atoms and no hydroxyl groups, and the oxyalkylation-susceptible starting material is tripentaerythritol.

References Cited in the file of this patent

UNITED STATES PATENTS

| | | |
|---|---|---|
| 1,859,913 | Burke | May 24, 1932 |
| 2,552,532 | De Groote | May 15, 1951 |

FOREIGN PATENTS

| | | |
|---|---|---|
| 601,604 | Great Britain | May 10, 1948 |